US008295858B2

(12) United States Patent
Fox et al.

(10) Patent No.: US 8,295,858 B2
(45) Date of Patent: Oct. 23, 2012

(54) RESTRICTING THE USE OF MOBILE TERMINALS BASED ON FORCED LOCATION UPDATING

(75) Inventors: David Fox, Reading (GB); Christopher David Pudney, Newbury (GB)

(73) Assignee: Vodafone Group PLC, Newbury, Berkshire (GB)

( * ) Notice: Subject to any disclaimer, the term of this patent is extended or adjusted under 35 U.S.C. 154(b) by 749 days.

(21) Appl. No.: 11/814,061

(22) PCT Filed: Dec. 16, 2005

(86) PCT No.: PCT/GB2005/004862
§ 371 (c)(1),
(2), (4) Date: Jul. 7, 2008

(87) PCT Pub. No.: WO2006/075126
PCT Pub. Date: Jul. 20, 2006

(65) Prior Publication Data
US 2009/0017819 A1    Jan. 15, 2009

(30) Foreign Application Priority Data
Jan. 17, 2005   (GB) .................................. 0500911.3

(51) Int. Cl.
*H04W 24/00* (2009.01)
(52) U.S. Cl. .................................................. 455/456.4
(58) Field of Classification Search ............... 455/435.1, 455/435.2, 456.4
See application file for complete search history.

(56) References Cited

U.S. PATENT DOCUMENTS

| 6,490,455 | B1 | 12/2002 | Park et al. |
| 6,832,093 | B1 * | 12/2004 | Ranta .......................... 455/456.4 |
| 6,970,932 | B1 * | 11/2005 | Juster ............................. 709/229 |
| 2002/0016180 | A1 * | 2/2002 | Derosier et al. ............... 455/522 |
| 2005/0227720 | A1 * | 10/2005 | Gunaratnam et al. ......... 455/510 |
| 2005/0239482 | A1 * | 10/2005 | Fan et al. .................... 455/456.4 |
| 2008/0101283 | A1 * | 5/2008 | Calhoun et al. ............... 370/328 |

FOREIGN PATENT DOCUMENTS

| EP | 0891110 A1 * | 1/1999 |
| EP | 1041847 | 10/2000 |
| WO | 98/34421 | 8/1998 |
| WO | 99/13673 | 3/1999 |

* cited by examiner

*Primary Examiner* — Nathan Mitchell
(74) *Attorney, Agent, or Firm* — Workman Nydegger

(57) ABSTRACT

A method and apparatus for temporarily disabling a mobile terminal which is associable with a mobile telecommunications network for obtaining communication services therefrom is described. A base station simulator (20) is provided which transmits a signal for causing the mobile terminal (1) to register with the base station simulator (20). For example, this signal may be transmitted at a power higher than the base stations (3,4,5) of PLMNs in the area around the mobile terminal. The base station simulator (20) then transmits a message to cause the mobile terminal (1) to be temporarily disabled from communicating with the network. For example, the message may force the mobile terminal to perform a Location Area Update and/or a Routing Area Update. The base station simulator (20) then rejects inappropriately the Location/Routing Area Update Request from the mobile terminal (1) and causes the mobile terminal (1) to deem its SIM/USIM to be invalid until the mobile terminal is power cycled or the SIM/USIM is removed. The invention may advantageously be used onboard aircraft. The base station simulator (20) may provide a pico cell to allow wireless telecommunication services to be provided to mobile terminals during aircraft flight.

37 Claims, 4 Drawing Sheets

RESTRICTING THE USE OF MOBILE TERMINALS BASED ON FORCED LOCATION UPDATING

FIELD OF THE INVENTION

The present invention relates to a method of and apparatus for temporarily disabling a mobile terminal which is associable with a mobile telecommunications network.

DESCRIPTION OF RELATED ART

Mobile telecommunications networks are widely used. However, there are some circumstances in which communicating using a mobile terminal and mobile telecommunications network is undesirable or unsafe. For example, the use of mobile terminals onboard an operating aircraft, particularly during takeoff and landing, is considered to be unsafe because the radio signals generated may interfere with the operating systems of the aircraft.

Currently passengers onboard aircraft are requested to deactivate their mobile terminals during the flight. However, there is always a possibility that passengers do not comply with this request.

Another arrangement for preventing communication is the use of electromagnetic screening (jamming). Here, the use of near continuous interference disrupts the radio communication provided by the mobile telecommunications network. This method requires significant power to block all available frequency bands. For example, a radio transmitter transmitting on the same frequencies as the mobile telecommunications network must be provided which has a power, received at the mobile terminals, higher than that of the mobile telecommunications network. The significant power may cause interference to the mobile telecommunications network and possible interference to other systems. This can be particularly problematic onboard an aircraft, where the systems that are interfered with are the control or safety systems of the aircraft.

Another known arrangement provides control over separate radio/transmission. Here a separate radio control mechanism transported over an independent transmission medium is used. This method requires an additional module with a control process and interface (for example, a different radio receiver) to be introduced into every mobile terminal and therefore the system cannot be relied upon without guaranteeing that every mobile terminal has this new module introduced and permanently enabled. For example, the mobile terminal would need to have the introduced radio receiver enabled permanently, listening for a beacon/request indicating to the introduced control module to power down the transmitter of the mobile terminal.

BRIEF SUMMARY OF THE INVENTION

According to a first aspect of the invention, there is provided a method of temporarily disabling a mobile terminal which is associable with a mobile telecommunications network for obtaining communications services therefrom, the method including transmitting from base station simulation means a signal for causing the mobile terminal to register with the base station simulation means and then transmitting from the base station simulation means a message to cause the mobile terminal to be temporarily disabled from communicating with the network.

For example, the signal transmitted by the base station simulation means may simulate a signal that might be transmitted by the network but at a relatively high strength when received at the mobile terminal. That is, the mobile terminal will "believe" that the base station simulation means is of a cell of the network that provides the best wireless coverage, thereby causing the mobile terminal to register with that base station simulation means in accordance with the standard operating procedure for the mobile terminal. This could be done by the base station simulation means duplicating a broadcast channel of a cell of the network in the radio range of the mobile terminal.

The message transmitted from the base station simulation means may include a special instruction to the mobile terminal to become temporarily inoperative. That is, a dedicated command to cause the mobile terminal to become inoperative could be sent. This is not a preferred arrangement.

Advantageously, the preferred arrangement is that the message includes an instruction for the mobile terminal to operate in such a manner as to be incapable of communicating with the network. Such a message may include a channel release message. Such a message may include an instruction to cause the mobile terminal to change its location area and/or routing area. This latter message causes the mobile terminal to request from the base station simulation means a new location area and/or routing area. The base station simulation means then rejects this request, and may include in the message an indication of the cause for rejection. If the network is a GSM or UMTS network, the cause may be set deliberately inappropriately to "IMSI unknown in HLR" (cause code #2), "Illegal ME" (cause code #6) or "Illegal MS" (cause code #3). A mobile terminal receiving one of these messages then considers that its SIM/USIM is invalid until the mobile terminal is power cycled or the SIM/USIM is removed. It can be seen that, in this embodiment, existing network signalling and messages are used to temporarily disable the mobile terminal. The base station simulator "deceives" the mobile terminal into believing that its SIM/USIM is invalid.

Therefore, advantageously, no modifications are required to the mobile terminals or network for the invention to be implemented.

In some circumstances it will be convenient for the base station simulation means to provide wireless communication services to the mobile terminal while the mobile terminal is temporarily disabled from communicating with the network. For example, in the embodiment to be described, where the base station simulation means is provided onboard an aircraft, the base station simulation means may provide a pico cell for wireless communication with the mobile terminal and for routing communications from the terminals to an appropriate network on the ground.

According to a second aspect of the invention, there is provided apparatus for temporarily disabling a mobile terminal which is associable with a mobile telecommunications network for obtaining communications services therefrom, the apparatus including base station simulation means for transmitting a signal for causing the mobile terminal to register with the base station simulation means and then transmitting a message to cause the mobile terminal to be temporarily disabled from communicating with the network.

The embodiment to be described allows mobile terminals to be temporarily disabled without requiring special functionality of the mobile terminal or mobile telecommunications network, or persistent radio transmission (as would be required for electromagnetic screening/jamming). Functionalities of existing mobile telecommunications networks are "misused" by the base station simulator to allow unmodified mobile terminals to be disabled semi-permanently. The embodiment does not introduce any power inefficiency into the mobile terminals. The embodiment semi-permanently disables the mobile terminals at a low layer; that is, it requires the mobile terminal to be re-booted (power cycled) to be reactivated.

BRIEF DESCRIPTION OF THE DRAWINGS

For a better understanding of the present invention an embodiment will now be described by way of example, with reference to the accompanying drawings, in which.

In the drawings like elements are generally designated with the same reference numeral.

DETAILED DESCRIPTION OF MODE OF CARRYING OUT THE INVENTION

Figure 1:
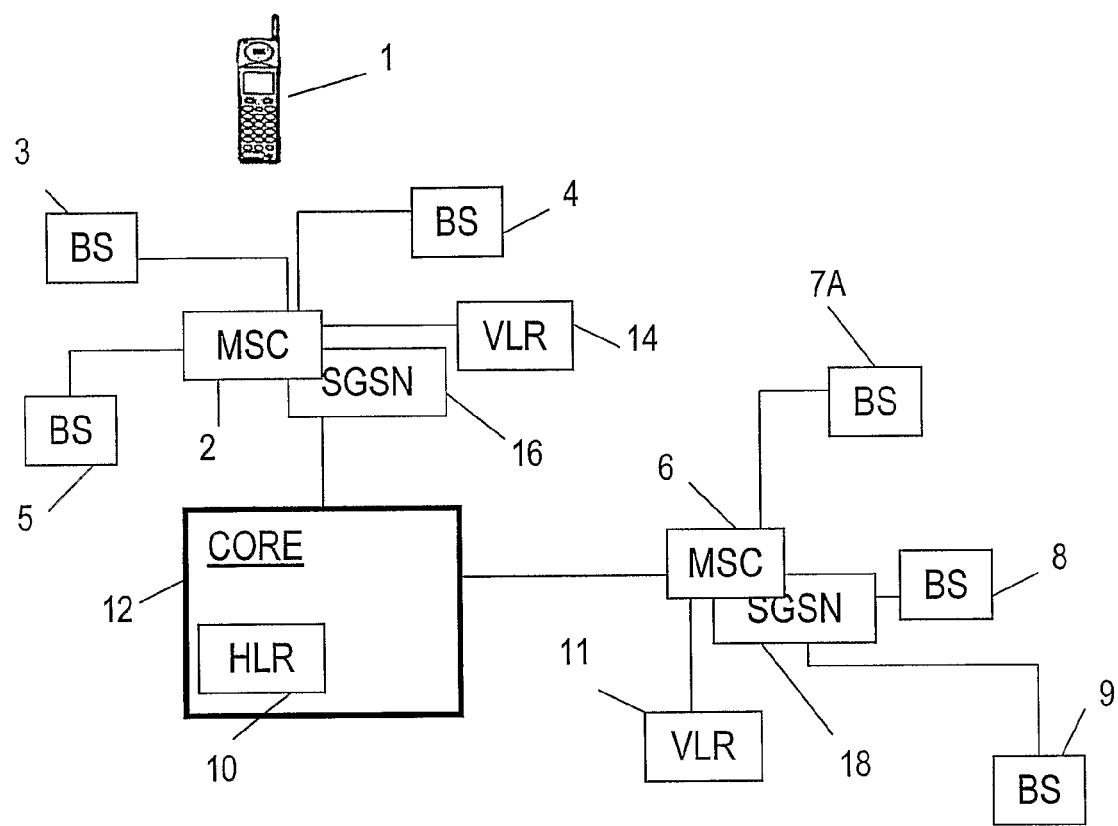
FIG. 1 is a diagrammatic drawing of key elements of a conventional GSM mobile telephone network for use in explaining the operation of such a network.

Key elements of a Public Land Mobile Network (PLMN), and its operation, will now briefly be described with reference to FIG. 1.

Each base station (BS) corresponds to a respective cell of its telecommunications network and receives calls from and transmits calls to a mobile terminal in that cell by wireless radio communication. Such a subscriber's mobile terminal is shown at 1. Each base station comprises a base transceiver station (BTS) and a base station controller (BSC). A BSC may control more than one BTS.

The base stations are arranged in groups and each group of base stations is controlled by a mobile switching centre (MSC), such as MSC 2 for base stations 3, 4 and 5. As shown in FIG. 1, the network has another MSC 6, which is controlling a further three base stations 7, 8 and 9. In practice, the network will incorporate many more MSCs and base stations than shown in FIG. 1.

Each subscriber to the network is provided with a smart card or (U)SIM which, when associated with the user's mobile terminal identifies the subscriber to the network. The SIM card is pre-programmed with a unique identification number, the "International Mobile Subscriber Identity" (IMSI) which is not visible on the card and is not known to the subscriber. The subscriber is issued with a publicly known number, that is, the subscriber's telephone number, by means of which calls to the subscriber are initiated by callers. This number is the MSISDN.

The network includes a home location register (HLR) 10 which, for each subscriber to the network, stores the IMSI and the corresponding MSISDN together with other subscriber data.

When the subscriber wishes to activate their mobile terminal in a network (so that it may make or receive calls subsequently), the subscriber places their SIM card in a card reader associated with the mobile terminal (terminal 1 in this example). The mobile terminal 1 then transmits the IMSI (read from the card) to the base station 3 associated with the particular cell in which the terminal 1 is located. The base station 3 then transmits this IMSI to the MSC 2 with which the BS 3 is registered.

MSC 2 now accesses the appropriate location in the HLR 10 present in the network core 12 and extracts the corresponding subscriber MSISDN and other subscriber data from the appropriate storage location, and stores it temporarily in a location in a visitor location register (VLR) 14. In this way, therefore the particular subscriber is effectively registered with a particular MSC (MSC 2), and the subscriber's information is temporarily stored in the VLR (VLR 14) associated with that MSC.

Each of the MSCs of the network (MSC 2 and MSC 6) has a respective VLR (14 and 11) associated with it and operates in the same way as already described when a subscriber activates a mobile terminal in one of the cells corresponding to one of the base stations controlled by that MSC.

When the subscriber using mobile terminal 1 wishes to make a call, having already inserted the SIM card into the reader associated with this mobile terminal in the manner described, a call may be made by entering the telephone number of the called party in the usual way. This information is received by the base station 3 and is then routed to the called party via the MSC 2. By means of the information held in the VLR 14, MSC 6 can associate the call with a particular subscriber and thus record information for charging purposes.

The MSCs 2 and 6 support communications in the circuit switched domain—typically voice calls. Corresponding serving gateway support modes (SGSNs) 16 and 18 are provided to support communications in the packet switched domain—such as GPRS data transmissions. A Gs interface may be located between each SGSN and MSC.

From the description above, it will be understood that the coverage area of a mobile telecommunications network is divided into a plurality of cells, each of which is served by a respective base station. Each cell is allocated a respective communication channel. The channels are allocated from a pool of channels. A list of available channels available in this pool is known as the Idle List and is maintained by each BSC.

The GSM/UMTS Standards describe a channel release procedure whereby the BSC releases a radio channel when it is no longer needed, the channel released being returned to the Idle List maintained by the BSC. The BSC also sends an RF Channel Release message to the relevant BTS specifying the channel to be released. After releasing the channel, the BTS sends an RF Channel Release Acknowledge to the BSC.

In order to allow a mobile terminal to maintain a call when the mobile terminal moves outside the coverage area of a cell, the call must be switched to an alternative cell automatically. When a call is in progress, while data are being sent/received, the mobile terminal 1 monitors the signal it receives from the 32 nearest cells listed in the current cell's "Neighbour List". The Neighbour List is defined by the network and includes the frequencies representing neighbour cells that the mobile terminal 1 should consider measuring for a particular cell site. Every second, the mobile terminal 1 reports the signal level of the best six channels in the Neighbour List to the base station 3, using a Slow Access Control Channel (SACCH). Generally, the mobile terminal 1 will try to use a cell that provides the strongest received signal at the mobile terminal 1. The call must be routed to the new cell before handover can be effected whilst maintaining the connection with the old cell until the new connection is known to have succeeded. Handover is a time-critical process requiring action to be taken before the radio link with the original cell degrades to such an extent that the call is lost. Handover requires synchronisation of events between the mobile terminal and the network. The Fast Access Control Channel (FACCH) is used to perform the handover process.

Handover between two cells served by the same MSC is relatively straightforward. The handover process is more complex when a mobile terminal moves between a first cell served by a first MSC and a second cell served by a second MSC. The VLRs of the MSCs and the HLR will additionally have to be updated to reflect that the mobile terminal is now in a cell served by the second MSC.

When a calling party (whether a subscriber within the mobile telecommunications network or outside it) attempts to call a mobile terminal within the network, that mobile terminal must be paged. Paging is a process of broadcasting a message which alerts a specific mobile terminal to take some action—in this example, to notify the terminal that there is an incoming call to be received. If the network knows in which cell the mobile terminal is located, it is only necessary to page in that cell. However, if the mobile terminal is moving within the network, the precise cell in which the mobile terminal is located may not be known. It will therefore be necessary to perform paging in a number of cells. The greater the number of cells in which paging must occur, the more use of valuable signalling capacity within the network.

However, if the HLR is to always have an up-to-date record of the cell in which each mobile terminal is located so that the current cell is occupied by a terminal is always know, this will require a large amount of location updating signalling between the mobile terminal and the HLR in order that the HLR has up-to-date records of the cells occupied by each mobile terminal. This is also wasteful of valuable signalling capacity.

As indicated above, the HLR is updated each time a mobile terminal moves from the coverage area of one MSC to another MSC and from one SGSN to another SGSN. However, typically the area covered by a single MSC and SGSN is large, and to page all the cells covered by a single MSC and SGSN would require a significant amount of paging signalling.

The problems of excessive use of signalling capacity by paging a multiplicity of cells or performing a multiplicity of frequent location updates is solved in a known manner by dividing the coverage area of the mobile telecommunications network into a plurality of Location Areas (LAs) and into a plurality of Routing Areas (RAs). Each LA and RA has a respective identity: LAI and RAI.

A location area relates to a particular geographical area for communications in the circuit-switched (CS) domain. Typically, although not necessarily, a location area is larger than the area of a single cell but is smaller than the area covered by one MSC. Each cell within the network broadcasts data indicative of the identity of its location area. The mobile terminal uses this data to determine when it moves into a new location area. The terminal stores its last known location area on its SIM. This information stored on the SIM is compared with the location area information broadcast by the local cell. If they are different, the mobile terminal determines that it has entered a new location area. The mobile terminal then gains access to a radio channel and requests a location update. If the MSC/VLR is the same for the new and old location areas, the network can immediately authenticate the mobile terminal and note the change of location area. However, if the mobile terminal is moved to a different MSC/VLR, the MSC/VLR addresses a message to the HLR. The HLR notes the new location and downloads security parameters to allow the network to authenticate the mobile. It also passes on subscription details of the user to the new VLR and informs the old VLR to delete its records.

A routing area relates to a particular geographical area for communications in the packet-switched (PS) domain. Typically, although not necessarily, a routing area is larger than the area of a single cell but is smaller than the area covered by one SGSN. A routing area is smaller than a location area. There may be many routing areas within one location area. Each cell within the network broadcasts data indicative of its routing area (in addition to the data mentioned above indicative of the identity of its location area). The mobile terminal uses this received data to determine when it moves to a new routing area. The terminal stores the last known routing area on its SIM. The information stored on the SIM is compared with the routing area information broadcast by the local cell. The identities of the two routing areas are compared. If they are different, the mobile terminal determines that it has entered a new routing area. The mobile terminal then gains access to a radio channel and requests a routing area update.

If the interface GS exists between each MSC and SGSN, the mobile terminal 1 may operate in Network Mode of Operation 1 (NM01), which allows mobile terminal 1 to update the location area and routing area stored in the network nodes of the CS and PS domain in a single message.

The foregoing is intended to be merely a simplified description of the normal operation of the GSM network. In practice, other procedures will be carried out. In particular, an authentication procedure will take place when a subscriber activates a mobile terminal using their SIM.

As mentioned above, there are circumstances in which it is required or desirable to disable mobile terminals; that is, to prevent mobile terminals from being able to access a PLMN. For example, the use of mobile terminals, communicating with a PLMN, onboard an operating aircraft, particularly during takeoff and landing, is considered to be a risk to safety.

Currently, aircraft passengers are asked to disable their mobile terminals during aircraft flights. If passengers do not comply with this request, it may jeopardise the safety of the aircraft.

Figure 2:
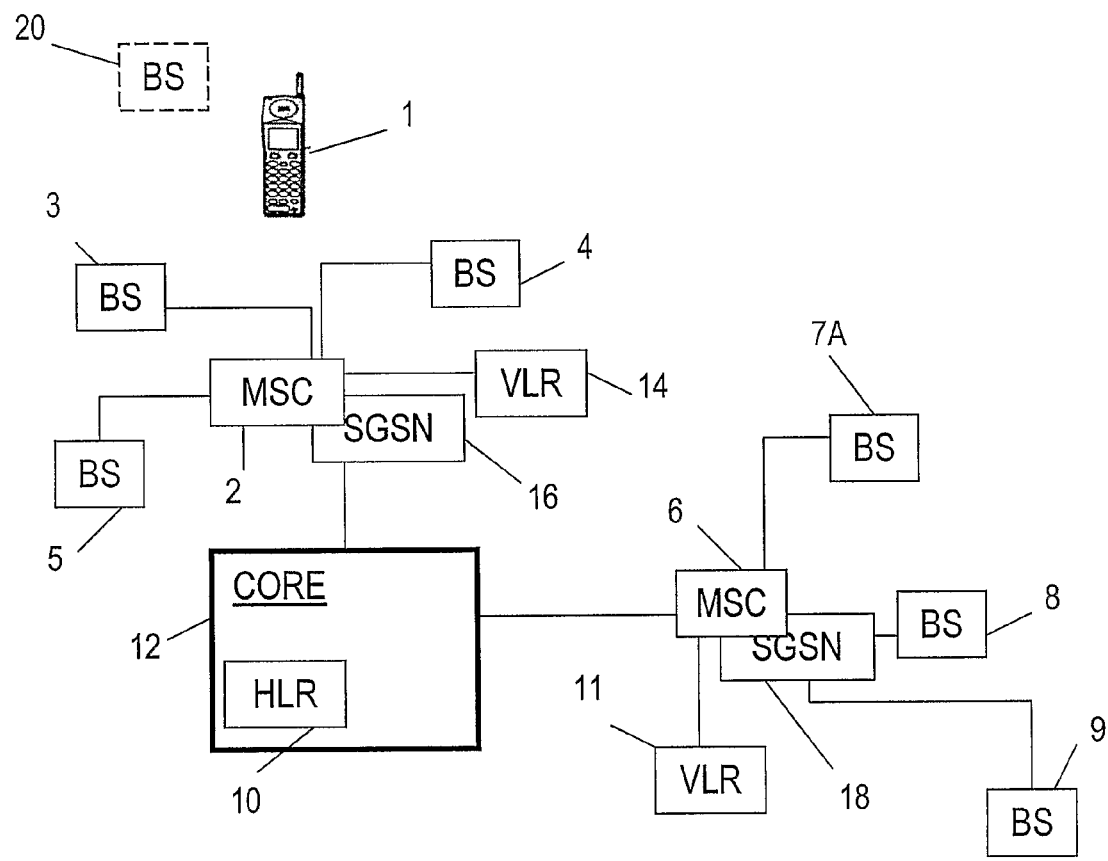
FIG. 2 is a diagrammatic drawing of the mobile telephone network of FIG. 1 but modified in accordance with the invention.
Figure 3A:
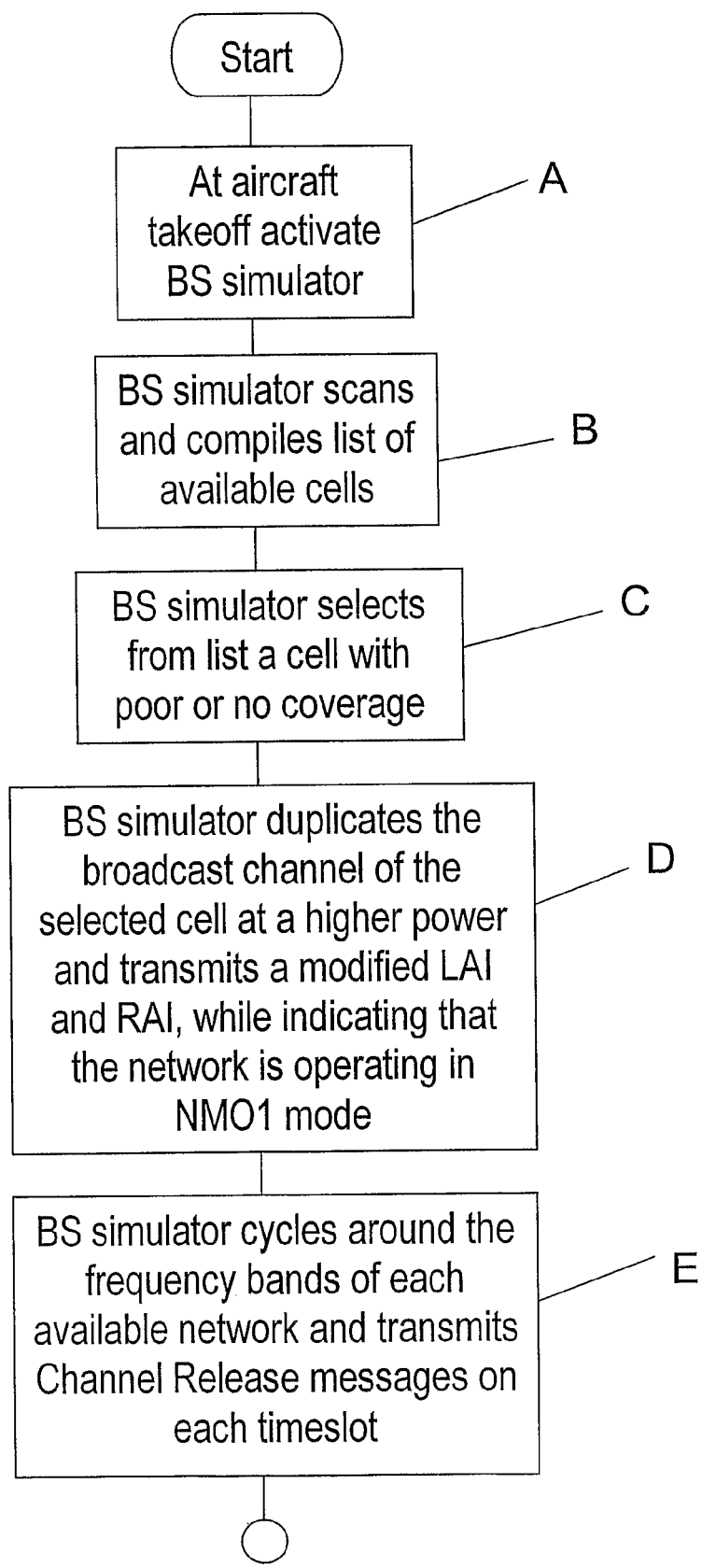
FIGS. 3A and 3B show a flow chart explaining the processes performed in accordance with the embodiment of the invention.
Figure 3B:
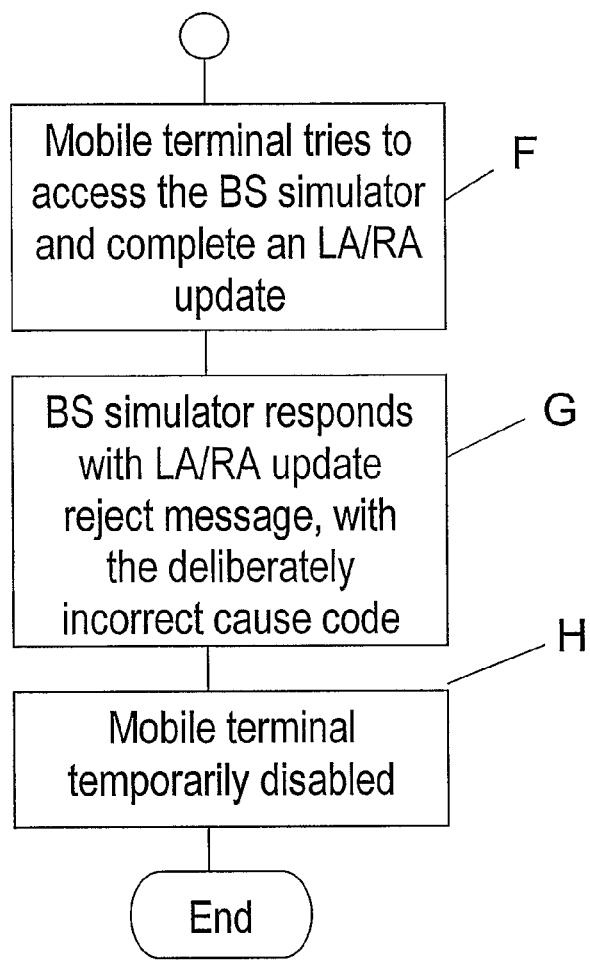

In accordance with a significant feature of the invention, shown in FIG. 2, a base station simulator 20 is provided in the aircraft. The base station simulator 20 includes a leaky antenna, providing good radio coverage, at a low transmission power. The base station simulator 20, as its name suggests, operates in a manner similar to a conventional base station but with additional functionality, and appears to mobile terminals onboard the aircraft to be a conventional base station. The operation of the base station simulator 20 will now be described with reference to the flow chart of FIGS. 3A and 3B.

Step A: The base station simulator 20 is activated at the time that it is wished to disable the mobile terminals onboard the aircraft. For example, the base station simulator 20 is activated when the aircraft engines are started or as the aircraft is taxiing on the runway prior to takeoff.

Step B: The base station simulator 20 additional functionality performs a scan of networks (PLMNs) available in the aircraft. These networks will include the conventional mobile telephone network shown in FIG. 1 (and FIG. 2) and, generally, other PLMNs. During this procedure the base station simulator 20 generates a Neighbour Cell List for each PLMN.

Step C: For each PLMN the base station simulator 20 selects a cell from the Neighbour Cell List for that PLMN which has poor or no radio coverage at the aircraft.

Step D: For each PLMN the base station simulator 20 duplicates the broadcast channel of the selected Neighbour Cell at a reasonable transmit power (i.e. at a power which provides better coverage to the mobile terminals onboard the aircraft than any other base station from that PLNM). This duplicated broadcast channel transmits the signal indicating that the network is operating in Network Mode of Operation 1 (NM01). As mentioned above, this indicates that an interface (Gs) exists between the MSC and SGSN with which the mobile terminal is associated, allowing the mobile terminal to update the location stored in the network nodes of the CS and PS domains in a single message. The base station simulator 20 transmits a modified Routing Area Identity (RAI) and Location Area Identity (LAI).

Step E: In order to be effective for all available PLMNs, the base station simulator 20 cycles around the frequency of each of the PLMNs. The base station simulator 20 transmits Channel Release messages on each time slot, forcing mobiles in dedicated mode to drop to idle mode and then register with the base station simulator 20 (as this provides the strongest radio signal). Alternatively, the base station simulator 20 could be configured to send a physical information message to any mobile terminals registering with the base station simulator 20.

Step F: The mobile terminals onboard the aircraft, including mobile terminals previously in packet transfer mode, will try to access the base station simulator 20 and complete a Location Area Update (if in the CS domain only), a Routing Area Update (if in the PS domain only) or a combined Routing Area Update and Location Area Update (if registered in both the CS and PS domains).

Step G: The base station simulator 20 responds to the Location Updating procedure with a Location Updating Reject message, which indicates that the reason for issuance of that message is "IMSI unknown to HLR". Similarly, the base station simulator 20 responds to the initiation of either of the Routing Area Updating procedures with a Routing Area Update Reject message, which message indicates that the reason for its issuance is "illegal MS".

Step H: The mobile terminal receiving either of these messages will then deem the SIM (or USIM) present to be invalid and will not allow the mobile terminal to provide communication services until the mobile terminal is power cycled (switched off and on) or the SIM (or USIM) is removed. The mobile terminal is thus temporarily disabled.

In accordance with an advantageous feature of the embodiment, it can be seen that in steps G and H above the base station simulator uses existing network commands to "deceive" the mobile terminal to believing that the SIM (or USIM) present is invalid.

During aircraft flight, the base station simulator 20 may be operated to provide communication services to the mobile terminals onboard the aircraft by acting as a pico cell, receiving and transmitting radio communications from and to the mobile terminals. These communications are then routed by the base station simulator 20 from the aircraft to the relevant PLMs, for example by special radio channels. For safety reasons, such a pico cell may only be operated whilst the aircraft is at its usual cruising altitude. When the aircraft begins its landing approach any voice connections or data sessions provided by the pico cell are ended, which forces the mobile terminals into idle mode. This may be done in two ways.

In a first arrangement, when a mobile terminal first registers with the pico cell provided by the base station simulator 20, the mobile terminal is provided with a value for its Periodic Routing Area Update (PRAU) timer such that the mobile terminal, possibly after performing numerous Routing Area Updates, performs a Routing Area Updating procedure at the end of the flight. That is, the mobile terminal would be provided with a PRAU timer value that corresponds to the expected length of the flight. The base station simulator 20 responds to the Routing Area Update request by sending a reject message and temporarily disabling the mobile terminal as described in steps G and H above.

Alternatively, the base station simulator (20) provides the mobile terminal 1 with information regarding a simulated neighbour cell, which has been introduced in the system information being passed by the base station simulator (20), to the mobile terminal. The base station simulator 20 then generates a simulation of this neighbour cell, operating at a reasonable power (i.e. higher than the power provided for the pico cell) just prior to the plane coming into the landing phase. The broadcast channel of the simulated neighbour cell has a different RAI and LAI code to the pico cell and indicates that the network is in MNO 1 mode, forcing the mobile terminal to complete a Location Area Update procedure, Routing Area Update procedure or a combined Routing/Location Area Update procedure. The base station simulator 20 then sends a Location Area Updating Reject or Routing Area Update Reject message, having set the cause code deliberately inappropriately to "IMSI unknown in HLR", "Illegal ME" or "Illegal MS". This, as in step H described above, causes the mobile terminal to deem the SIM (or USIM) to be invalid until the mobile terminal is power cycled or the SIM (or USIM) is removed.

When it is deemed to be safe for the mobile terminals to be used to communicate directly with their associated PLMN (whether or not a pico cell has been provided during the flight), typically when the aircraft has landed and the engines are shut down, the aircraft passengers are instructed to switch their mobile terminals on (or power-cycle them if they were on during the flight). Because the base station simulator 20 is now deactivated, the mobile terminals perform the standard procedures to register with an appropriate cell of the PLMN with which they have a subscription in the conventional manner, whereafter normal mobile telecommunications services can be provided.

In the embodiment described the base station simulator 20 provides a pico cell to allow the mobile terminals to perform wireless communications during aircraft flight. This is an optional feature of the invention. However, the invention makes the provision that such a pico cell more feasible because it provides a mechanism for automatically deactivating the mobile terminals when this is required for safety reasons.

It should also be noted that, although the embodiment described relates to controlling the use of mobile terminals onboard an aircraft, the invention is equally applicable in other circumstances where the use of mobile terminals may wish to be controlled.

Although the embodiment described is in relation to a GSM mobile telecommunications network, the invention is applicable to other mobile (cellular) telecommunication types, such as UMTS (3G).

The invention claimed is:

1. A method of temporarily disabling a mobile terminal which is associable with a mobile telecommunications network for obtaining communications services therefrom, the method comprising:
   selecting, at a base station simulation means, a cell of the mobile telecommunications network in the radio range of the mobile terminal to simulate;
   transmitting, from the base station simulation means, a simulation signal that simulates a signal transmitted by a base station of the selected cell, the simulation signal being transmitted at a power sufficient to cause the mobile terminal to register with the base station simulation means; and
   transmitting, from the base station simulation means, a message to cause the mobile terminal to be temporarily disabled from communicating with the mobile telecommunications network.

2. The method of claim 1, wherein the base station simulation means duplicates a broadcast channel of the base station of the selected cell.

3. The method of claim 1, wherein the base station simulation means instructs the mobile terminal to re-register to the base station simulation means at a defined time.

4. The method of claim 1, wherein the message includes a special instruction to the mobile terminal to become temporarily inoperative.

5. The method of claim 1, wherein the message includes an instruction for the mobile terminal to operate in such a manner as to be incapable of communicating with the network.

6. The method of claim 5, wherein the message comprises a channel release message.

7. A method of temporarily disabling a mobile terminal which is associable with a mobile telecommunications network for obtaining communications services therefrom, the method comprising:
   transmitting, from a base station simulation means, a signal for causing the mobile terminal to register with the base station simulation means; and
   transmitting from the base station simulation means a message to cause the mobile terminal to be temporarily disabled from communicating with the mobile telecommunications network, wherein the message includes an instruction for the mobile terminal to operate in such a manner as to be incapable of communicating with the mobile telecommunications network, and wherein the message comprises an instruction to cause the mobile terminal to change the location area and/or routing area of the mobile terminal.

8. The method of claim 7, wherein the base station simulation means responds to a request from the mobile terminal for a new location area and/or routing area by rejecting the request.

9. The method of claim 7, wherein the base station simulation means responds to a scheduled request from the mobile terminal to confirm the location area and/or routing area by rejecting the request.

10. The method of claim 8, wherein the base station simulation means rejects the location area and/or routing area request inappropriately with cause code #2: IMSI unknown in HLR.

11. The method of claim 8, wherein the base station simulation means rejects the location area and/or routing area request inappropriately with cause code #3: Illegal MS.

12. The method of claim 8, wherein the base station simulation means rejects the location area and/or routing area request inappropriately with cause code #6: Illegal ME.

13. The method of claim 1, wherein the mobile terminal is rendered enabled, following said disabling, by power-cycling the mobile terminal.

14. The method of claim 1, wherein the base station simulation means is operable to provide wireless communication services to the mobile terminal while the mobile terminal is temporarily disabled from communicating with the mobile telecommunications network.

15. The method of claim 1, wherein the mobile terminal has smart card means associated therewith and wherein the message causes the mobile terminal to deem the smartcard means temporarily invalid.

16. The method of claim 15, wherein the smart card means comprises a SIM or USIM.

17. The method of claim 1, wherein the mobile telecommunications network comprises a GSM or UMTS cellular network.

18. An apparatus for temporarily disabling a mobile terminal which is associable with a mobile telecommunications network for obtaining communications services therefrom, the apparatus comprising:
   a base station simulation means configured to:
      select a cell of the mobile telecommunications network in the radio range of the mobile terminal to simulate;
      transmit a simulation signal that simulates a signal transmitted by a base station of the selected cell, the simulation signal being transmitted at a power sufficient to cause the mobile terminal to register with the base station simulation means; and
      transmit a message to cause the mobile terminal to be temporarily disabled from communicating with the mobile telecommunications network.

19. The apparatus of claim 18, wherein the base station simulation means duplicates a broadcast channel of the base station of the selected cell.

20. The apparatus of claim 18, wherein the base station simulation means is operable to instruct the mobile terminal to re-register to the base station simulation means at a defined time.

21. The apparatus of claim 18, wherein the message includes a special instruction to the mobile terminal to become temporarily inoperative.

22. The apparatus of claim 18, wherein the message includes an instruction for the mobile terminal to operate in such a manner as to be incapable of communicating with the mobile telecommunications network.

23. The apparatus of claim 22, wherein the message comprises a channel release message.

24. The apparatus of claim 22, wherein the message comprises an instruction to cause the mobile terminal to change the location area and/or routing area of the mobile terminal.

25. The apparatus of claim 24, wherein the base station simulation means is operable to respond to a request from the mobile terminal for a new location area and/or routing area by rejecting the request.

26. The apparatus of claim 24, wherein the base station simulation means is operable to respond to a scheduled request from the mobile terminal to confirm the location area and/or routing area by rejecting the request.

27. The apparatus of claim 26 wherein the base station simulation means rejects the location area and/or routing area request inappropriately with cause code #2: IMSI unknown in HLR.

28. The apparatus of claim 26, wherein the base station simulation means rejects the location area and/or routing area request inappropriately with cause code #3: Illegal MS.

29. The apparatus of claim 26, wherein the base station simulation means rejects the location area and/or routing area request inappropriately with cause code #6: Illegal ME.

30. The apparatus of claims 18, wherein the mobile terminal is rendered enabled, following said disabling, by power-cycling the mobile terminal.

31. The apparatus of claim 18, wherein the base station simulation means is operable to provide wireless communication services to the mobile terminal while the mobile terminal is temporarily disabled from communication with the mobile telecommunications network.

32. The apparatus of claim 18, wherein the mobile terminal has smart card means associated therewith and wherein the message causes the mobile terminal to deem the smartcard means temporarily invalid.

33. The apparatus of claim 32, wherein the smart card means comprises a SIM or USIM.

34. The apparatus of claim 18, wherein the mobile telecommunications network comprises a GSM or UMTS cellular network.

35. A method for temporarily disabling a mobile terminal having smart card means associated therewith, the method comprising the following steps:
    selecting, at a particular simulated mobile telecommunications cell, a cell of a network in the radio range of the mobile terminal to simulate;
    causing the mobile terminal to register with the particular simulated mobile telecommunications cell by having the particular simulated mobile telecommunications cell simulate a signal transmitted by a base station of the selected cell; and
    transmitting, at the particular simulated mobile telecommunications cell, a signal to the mobile terminal to cause the mobile terminal to deem the smart card means temporarily invalid.

36. The method of claim 1, the method further comprising:
    scanning a plurality of available mobile telecommunications networks to determine those mobile telecommunications networks accessible by the base station simulation means.

37. The apparatus of claim 18, wherein the base station simulation means is further configured to scan a plurality of available mobile telecommunications networks to determine those mobile telecommunications networks accessible by the base station simulation means.

* * * * *